United States Patent [19]

Bobick et al.

[11] Patent Number: 4,467,366
[45] Date of Patent: Aug. 21, 1984

[54] INK DROP DUPLICATING SYSTEM

[75] Inventors: Thomas W. Bobick, Richardson; Frederic L. Clark, Plano; Suresh C. Paranjpe, Dallas, all of Tex.

[73] Assignee: The Mead Corporation, Dayton, Ohio

[21] Appl. No.: 355,781

[22] Filed: Mar. 8, 1982

[51] Int. Cl.³ .................... H04M 1/22; G01D 15/18
[52] U.S. Cl. ................................. 358/296; 346/75
[58] Field of Search ......................... 346/75; 358/296

[56] References Cited

U.S. PATENT DOCUMENTS

| | | | |
|---|---|---|---|
| 3,811,110 | 5/1974 | Inose et al. | 340/146.3 |
| 3,911,818 | 10/1975 | MacIlvaine | 101/426 |
| 4,009,332 | 2/1977 | Van Hook | 358/280 |
| 4,010,477 | 3/1977 | Frey | 346/75 |
| 4,025,925 | 5/1977 | Jensen et al. | 346/75 |
| 4,052,699 | 10/1977 | Micka et al. | 340/146.3 |
| 4,084,195 | 4/1978 | Pereira | 358/280 |
| 4,085,409 | 4/1978 | Paranjpe | 346/75 |
| 4,091,390 | 5/1978 | Smith et al. | 346/75 |
| 4,097,873 | 6/1978 | Martin | 346/75 |
| 4,122,458 | 10/1978 | Paranjpe | 346/75 |
| 4,168,488 | 9/1979 | Evans | 340/146.3 |
| 4,194,210 | 3/1980 | Krause | 346/75 |
| 4,219,822 | 8/1980 | Paranjpe | 346/75 |
| 4,259,696 | 3/1981 | Paranjpe et al. | 358/296 |
| 4,271,476 | 6/1981 | Lotspiech | 364/515 |

OTHER PUBLICATIONS

Morrin-IBM Technical Disclosure Bulletin, vol. 18, pp. 2640-2642, Jan. 1976.
Gold et al.-IBM Technical Disclosure Bulletin-vol. 18, pp. 2633-2639, Jan. 1976.
Casey et al.-IBM Technical Disclosure Bulletin-vol. 13, pp. 3267-3268, Apr. 1971.

Primary Examiner—John C. Martin
Assistant Examiner—Edward L. Coles
Attorney, Agent, or Firm—Biebel, French & Nauman

[57] ABSTRACT

An ink drop duplicating system employs a plurality of angularly extending ink drop print heads to reproduce an original document. Each printing head produces a row of drop streams which are individually controlled to deposit printing drops at a plurality of printing positions along a line extending perpendicular to the major axis of the printing head. Printing control information for the ink drop printing heads is generated by a photosensing array which extends across one major dimension of an original document and which is scanned across the other major dimension. Scanning data is stored on a magnetic disk. After one or more original documents have been completely scanned, the scanning data is read from the magnetic disk and reorganized to produce drop control signals for the ink drop printing heads.

16 Claims, 16 Drawing Figures

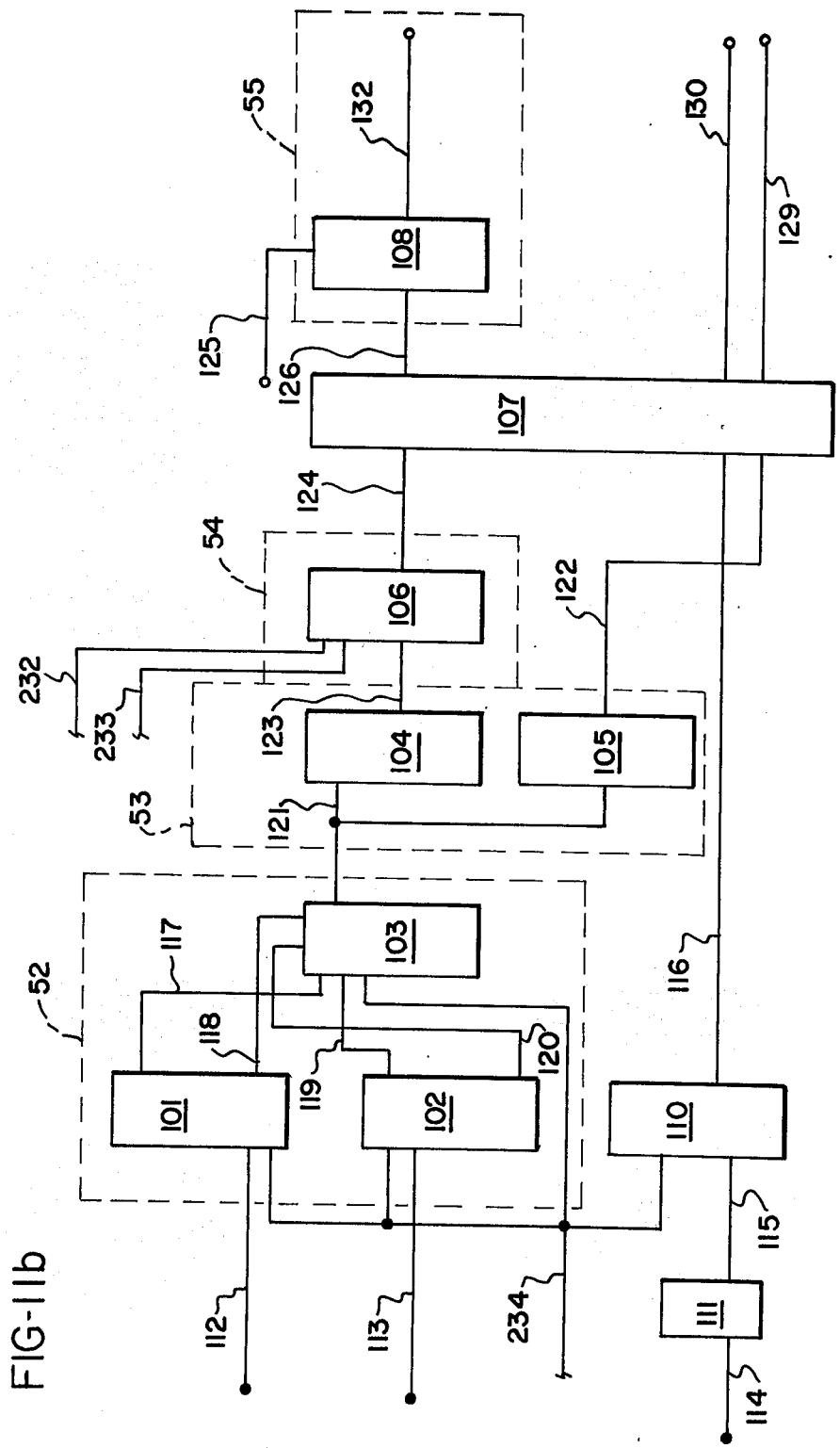

INK DROP DUPLICATING SYSTEM

BACKGROUND OF THE INVENTION

This invention relates to the field of ink drop printing. Systems for performing ink drop printing have undergone substantial development in recent years and are utilized for a variety of applications. Typical applications are for word processing, as shown in Hill et al U.S. Pat. No. 3,964,591, forms printing, as shown in MacIlvaine U.S. Pat. No. 3,911,818, bar code printing, as shown in Duffield U.S. Pat. No. 3,787,881, document addressing, as shown in Bok et al U.S. Pat. No. 4,283,731, facsimile reproduction, as shown in Van Brimer et al Nos. 3,588,906, document copying, as shown in Van Hook 4,009,332, and duplicating, as shown in Paranjpe et al 4,259,696. Techniques for drop generation and control include drop-on-demand systems as shown in Stemme et al 3,747,120, non-stimulated jets as shown in Hertz 3,416,153, stimulated and variably deflected jets as shown in Lewis et al 3,298,030 and stimulated and binarily switched jets as shown in Sweet et al 3,373,437. The art has now become quite well developed, and there are many variations of each of the above mentioned ink drop printers.

Generally speaking, prior art ink drop printers have been either relatively slow in their operation or relatively limited in the resolution of printed output. The high resolution printers have generally utilized a single drop generator or a group of relatively few drop generators which necessarily required a relatively long time to complete a sizable printing job. Ink drop printers of the type disclosed in the above mentioned Sweet et al patent are able to operate at very high speeds, but their resolution has been limited due to the difficulty of placing a great many drop generators close enough together to meet the operating constraints of that particular type of printer.

One solution to the problem of obtaining high speed and high resolution has been to provide a plurality of parallel staggered and laterally extending print bars as taught in Taylor et al RE No. 28,219. However, in order to meet the resolution requirements associated with document duplicating, the system of Taylor et al requires a fairly large number of print heads, and this in turn creates manufacturing costs which are non-competitive with more conventional duplicating systems.

One approach to a cost competitive ink drop duplicator in shown in Paranjpe et al U.S. Pat. No. 4,259,696. In the Paranjpe patent a single printing head is oscillated back and forth across a plurality of printing positions. Copy sheets are transported under the printing head as it is oscillated back and forth. Switching control information for the printing jets is generated by scanning an original document with a photodetecting array. The photodetecting elements comprising the array are arranged in a manner similar to the arrangement of jets in the ink drop printing head. Scanning of the document proceeds in a manner similar to the pattern of scanning of the print head over the copy sheet. This system requires that an original document be scanned one time for each copy printed by the print head, so that the scanning device must be moved at very high scanning rates and very high levels of illumination must be employed. The high speed scanning and the mechanical oscillation of the jets also create severe design problems.

SUMMARY OF THE INVENTION

In accordance with the present invention, there is provided an ink drop duplicating system which operates effectively and economically at high speed and at high resolution. The system achieves such results by providing an ink drop printing arrangement comprising a plurality of angularly extending ink drop printing heads which print a set of contiguous bands collectively covering an area of a substrate which is to be printed. Each printing head produces a row of drop streams which are individually controlled to deposit printing drops at printing positions along lines extending perpendicular to the major axis of the printing head.

Scanning of an original document is provided by sensing means which view a series of picture elements at side-by-side sensing positions within a strip extending across the document to generate a series of print/no-print data bits corresponding to the picture elements being viewed. A scanning arrangement causes the sensing means to view a series of such strips collectively covering all portions of the original document which are to be duplicated.

Data transfer means are provided for establishing a locational correspondence between the sensing positions which are sensed by the sensing means and the printing positions which are printed by the printing heads. The data transfer means selects the data bits in accordance with the locational correspondence so established and generates printing commands in accordance with the print/no-print states of the data bits so selected. In the preferred embodiment, the data bits are stored on a magnetic disk in a sequence corresponding to the scanning sequence and are reorganized upon readout from the magnetic disk to generate the printing commands.

Accordingly, it is an object of the present invention to provide a system for performing ink drop duplicating at high speed and high resolution.

Other objects and advantages of the invention will be apparent from the following description, the accompanying drawings, and the appended claims.

BRIEF DESCRIPTION OF THE DRAWINGS

FIGS. 11a and 11b are a block diagram of a control means for data reorganization;

DESCRIPTION OF THE PREFERRED EMBODIMENTS

Figure 1:
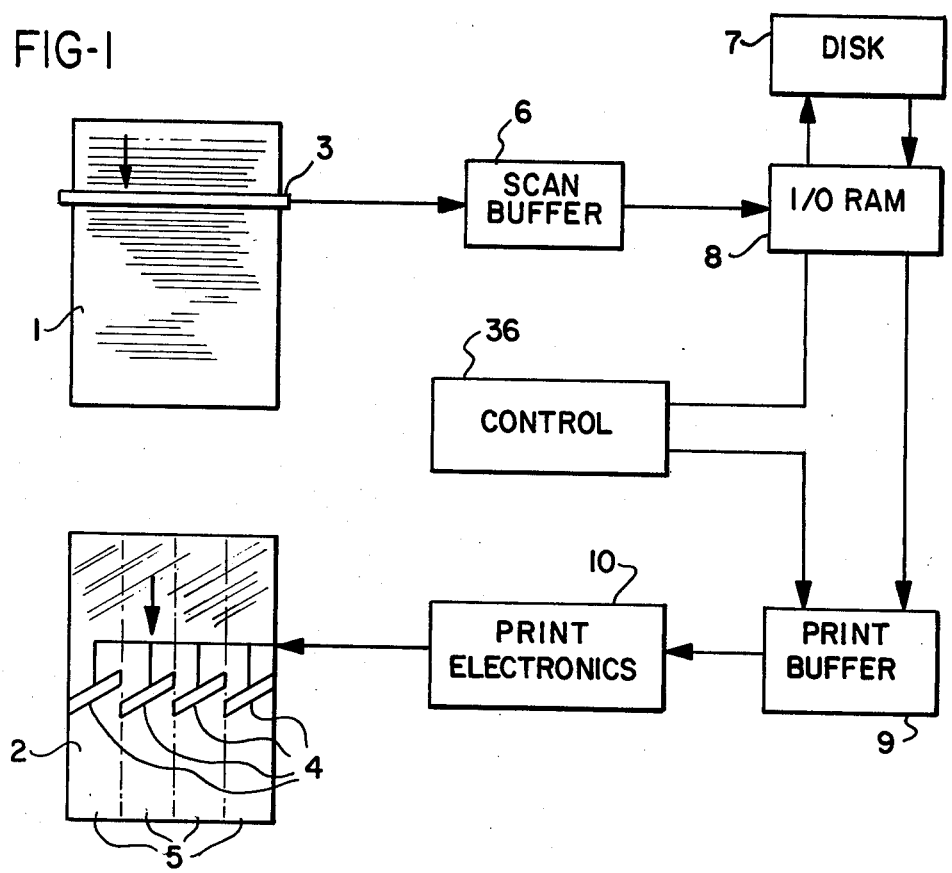
FIG. 1 is a block diagram of an ink drop duplicating system according to the present invention.
Figure 5:
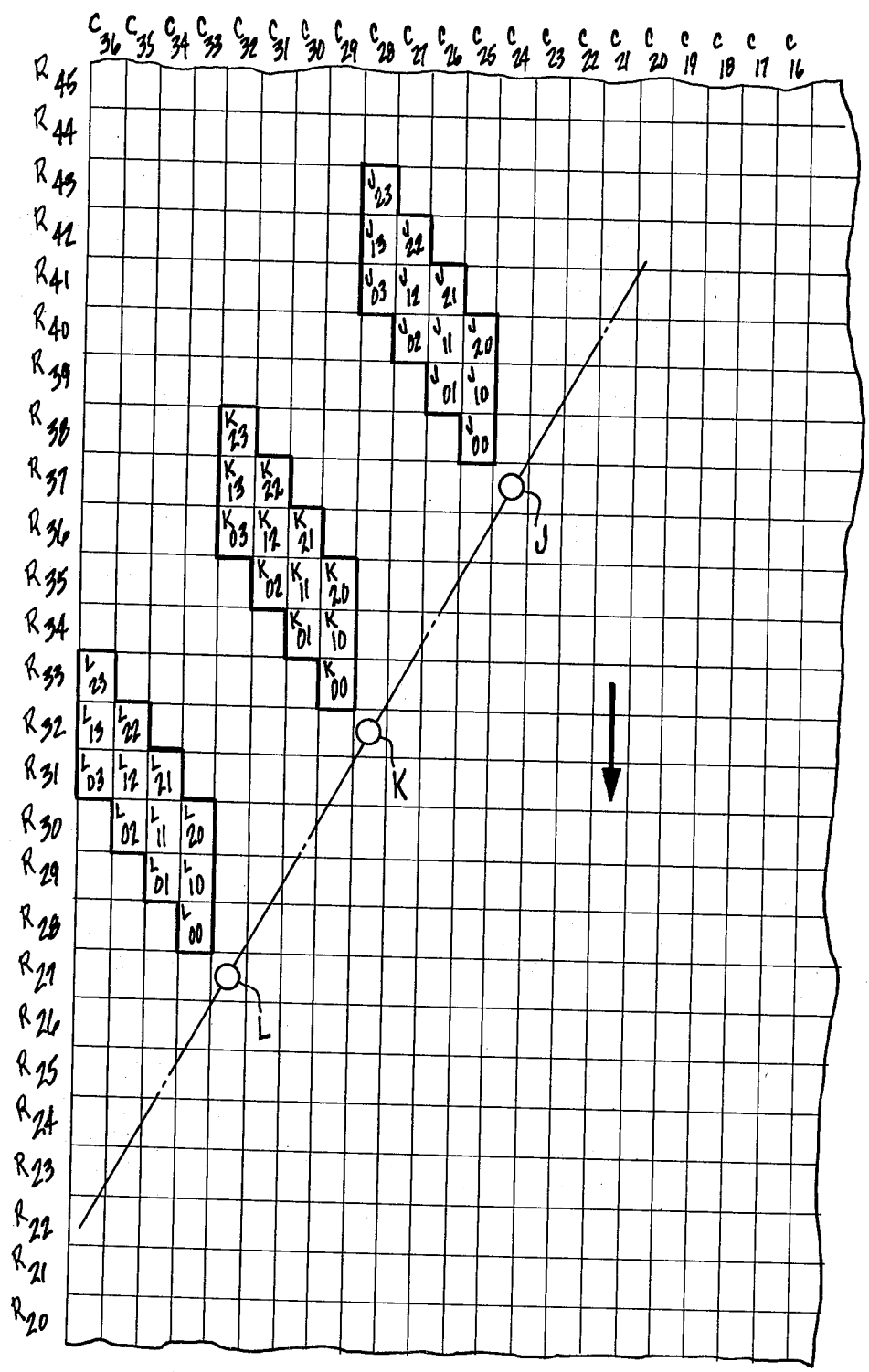
FIG. 5 is a diagrammatic illustration of printing positions as sequentially printed by drops from three adjacent drop streams.

An ink drop duplicating system in accordance with the present invention may be configured as generally illustrated in FIG. 1. Thus an original document 1 may be scanned by a laterally extending scanning array 3 for subsequent duplication on a copy sheet 2 by a series of angularly arranged printing heads 4. Each printing head 4 prints within one of a series of contiguous bands 5 collectively covering an area at copy sheet 2 which is to be printed. Printing heads 4 operate under control of printing electronics 10 which generate charging control signals as hereinafter described in response to printing data from print buffer 9. The printing data in print buffer 9 is arranged in a format so as to produce printing as illustrated in FIG. 5.

Scanning signals from scanning array 3 are supplied to scan buffer 6 as a series of analog voltages from each of a series of photosensors comprising scanning array 3. Accordingly scan buffer 6 includes circuitry for digitizing the analog scanning signals. The digitized output indicates a black/white representation for each of the picture elements within a two-dimensional cartesian grid on the face of document 1. If desired, the image data may be filtered by digital filtering techniques for improvement of the image to be reproduced. Also, the image data may be processed in a conventional manner to provide a pseudo gray scale.

After the image data has been appropriately processed, it is stored in scan buffer 6 on a scan line basis. When a complete scan line has been stored, it is transferred as 16-bit parallel data to Input-Output RAM 8. After being transferred to I/O RAM 8, the data is formatted into blocks of 234 scan lines. After each complete block of data has been assembled, it is transferred to a magnetic disk 7 as 8-bit parallel data. Two transfers are required for each block of data because of the data reorganization from 16-bit bytes into 8-bit bytes. The transfer from scan buffer 6 through I/O RAM 8 and into disk 7 proceeds under control of control unit 36. It will be noted that the image data is stored on disk 7 in a sequence as generated by scan buffer 6.

After all scanning for a particular printing job (which may include a number of original documents 1) has been completed, output printing begins. At this time the scan data stored on disk 7 is transferred back to I/O RAM 8 in a 16-bit parallel transfer. Once again the data is stored in blocks representing 234 scan lines. Once the data has been returned to I/O RAM 8 it is read out to print buffer 9, under control of control unit 36. Control unit 36 operates in accordance with an algorithm, as hereinafter described, to calculate memory locations within I/O RAM 8 for readout to print buffer 9. The data supplied to print buffer 9 is used for printing control as above described.

Figure 2:
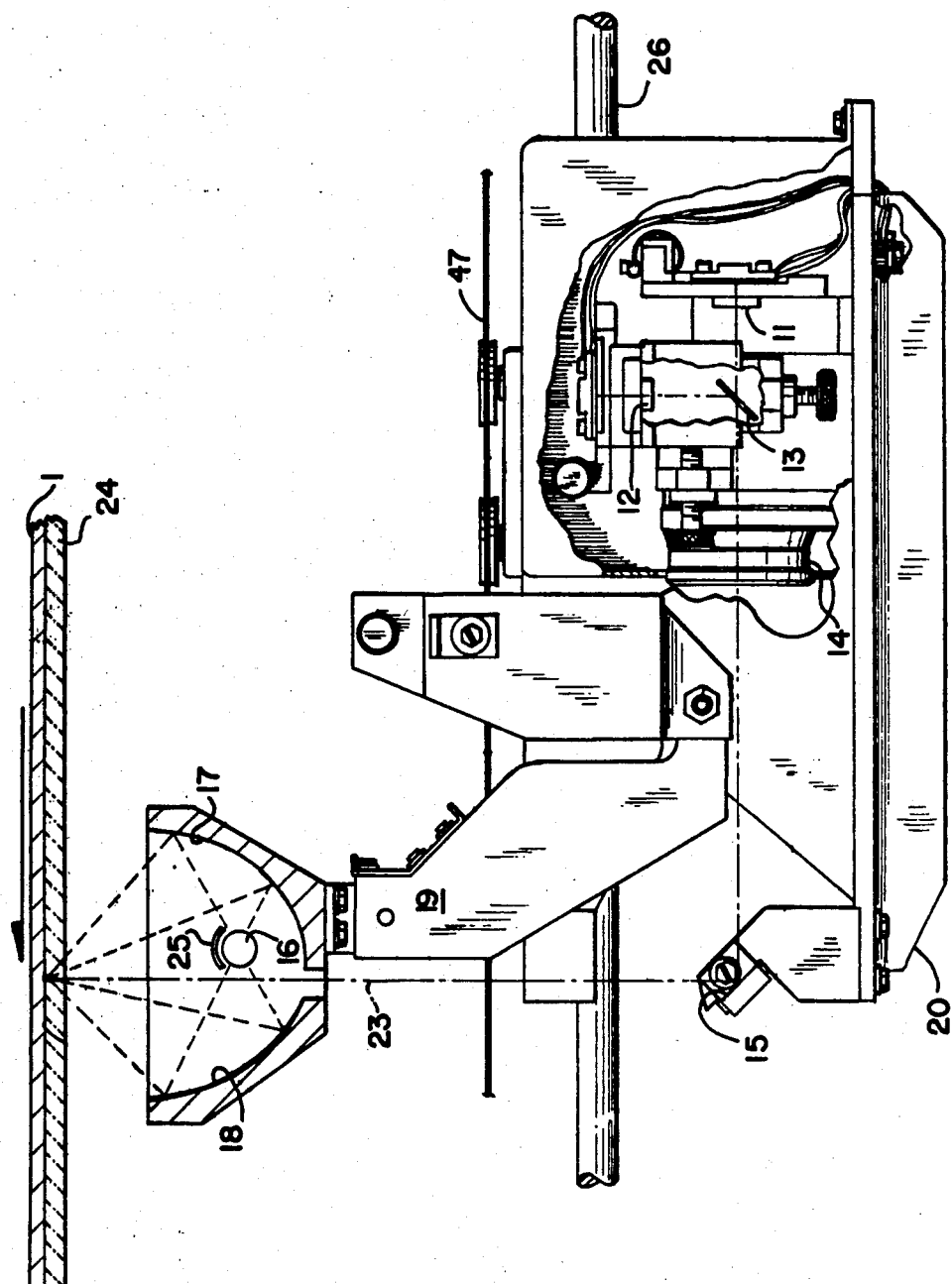
FIG. 2 is a partially cut away side elevation view of original document scanning apparatus for use in practicing the invention.
Figure 3:
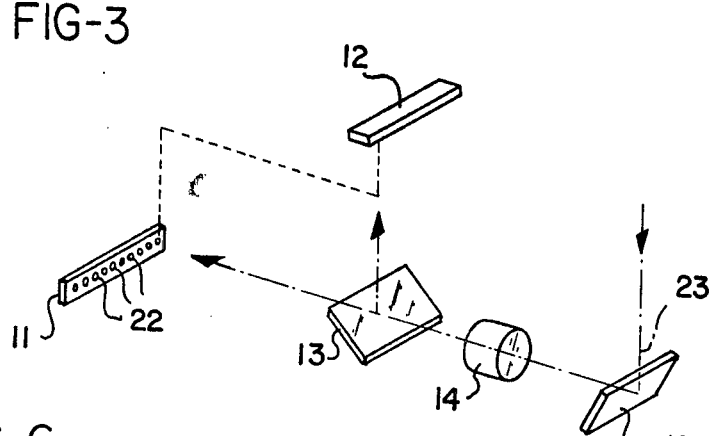
FIG. 3 is a pictorial drawing of the optical path formed by the scanning elements of FIG. 2.

While scanning array 3 is illustrated in FIG. 1 as being a single structure extending across the width of original document 1, it is convenient to utilize a pair of scanning arrays 11 and 12 supported as illustrated in FIG. 2 and arranged as schematically illustrated in FIG. 3. Collectively, scanning arrays 11 and 12 view a strip extending across the width of original document 1, but each array views only one half of the document. This arrangement permits use of conventional CCD scanning arrays such as CCD 143 scanning arrays manufactured by Fairchild Instrument Company which are not long enough to extend across the full width of documents customarily utilized in an office environment.

As illustrated in FIG. 3, each of scanning arrays 11 and 12 comprises a series of photo-sensors 22 which are optically butted together by a beam splitter 13. As illustrated in FIG. 3, beam splitter 13 splits a beam of light following an optical path which reflects off the face of a folding mirror 15 and then passes through a lens 14. Each of the elements illustrated in FIG. 3 is supported by a carriage 20, as illustrated in FIG. 2.

Referring now to FIG. 2, it will be seen that original document 1 may be supported on a platen 24 for scanning by scanning arrays 11 and 12. In order to accomplish scanning, the scanning arrays may be held stationary while original document 1 is moved across platen 24. Alternatively, document 1 may be held stationary while carriage 20 carries scanning arrays 11 and 12 along a scanning path thereunder. If desired, an automatic document feeder may be utilized for transporting original document 1 across the surface of platen 24, turning the document over and directing it back to platen 24 for reverse side scanning. Document movement for reverse side scanning may proceed in a direction opposite to the direction for front side scanning. Also, front side scanning and rear side scanning may be carried out at different locations along platen 24, in which case carriage 20 may be moved back and forth between the two positions to accommodate such scanning.

Light for scanning document 1 is generated by a linearly extending lamp 16, which is shielded from document 1 by a shield 25. Lamp 16 is placed along the focal line of an ellipse defined in part by a pair of reflectors 17 and 18. Reflectors 17 and 18 are supported by support arm 19 so as to maintain the scanning surface of document 1 at the second focal line of the above mentioned ellipse. Arm 19 is supported by carriage 20, which in turn rides along a rail 26. A drive motor (not illustrated) and a cable 47 are provided for driving movement of carriage 20.

Figure 4:
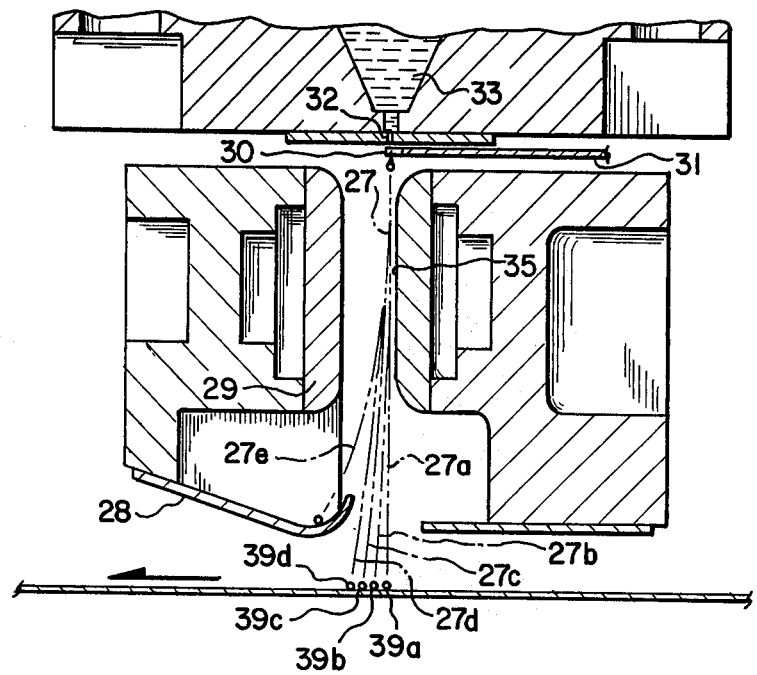
FIG. 4 is a partial cross sectional view of an ink drop printing head for use in practicing the invention.

Each of print heads 4 may be constructed as generally illustrated in FIG. 4. The overall operation of one of print heads 4 is similar to the operation of a print head of the type illustrated in Paranjpe U.S. Pat. No. 4,085,409. A supply of printing ink for carrying out the printing operation is maintained within a manifold 33 and is forced out under pressure through a series of orifices 32 (only one orifice 32 being illustrated in FIG. 4). This causes formation of a series of streams 27, which are caused to break up into uniformly sized and regularly spaced drops under the stimulating action of a stimulation transducer (not illustrated). The break up of streams 27 into drops occurs at charging electrodes 30 which are a series of conductively coated notches along one edge of a charge plate 31. Charge plate 31 is constructed as taught in Culp U.S. Pat. No. 3,618,858.

As drops are formed by drop streams 27, they are selectively charged by charging voltages applied to charging electrodes 30. These charging voltages may have any of five different levels (one of which may be zero), so any drop in one of streams 27 may have any one of five different charging states.

After the drops are charged as above described, they pass through an electrostatic deflection field established between a pair of deflection electrodes 29 and 35. This causes the drops to be deflected in proportion to their charge level. Thus the drops may be caused to follow any one of five different trajectories 27a through 27e, as illustrated in FIG. 4. Those of the drops which are highly charged follow the most deflected trajectory 27e and are caught by a catcher 28. These are non-printing drops. All other drops deposit on copy sheet 2 at printing positions 39a through 39d.

It will be appreciated that the position of catcher 28 is a matter of convenience and that trajectory 27a could be a printing trajectory and trajectory 27e a catching trajectory. It will also be appreciated that the drops forming the streams 27 tend to interact with each other. Thus it may be desirable to place compensating voltages on charging electrodes 30 and to place non-printing guard drops between printing drops. Such generation of compensating voltages and the provision of guard drops is well known and need not be discussed here in further detail.

As mentioned above, the printing control information which is stored on disk 7 consists of black/white or print/no-print data. Print electronics 10 must convert such binary data into multi-level charge signals for generation of appropriate charging voltages. This is conveniently accomplished by generating a stairstep control waveform for each control channel and switching the waveform on or off in response to the black/white state of the data read out from print buffer 9. Circuitry for generating such a stairstep waveform is well known and need not be further described. By way of example, such circuitry may function as generally described in Lewis et al U.S. Pat. No. 3,298,030.

Reference will now be made to FIG. 5 for an explanation of the relationship between the coordinate system of scanning array 3 and the coordinate system of print head 4. FIG. 5 illustrates only a portion of one of the printed bands 5. The figure illustrates a rectangular matrix with each cell representing a picture element on either original document 1 or on copy sheet 2. The vertical columns and horizontal rows of the cells are given column numbers and row numbers which uniquely define the position of a cell on the original document and as scanned by scanning array 3. The figure also gives a series of additional designations for certain of the cells as they may be printed by drops from a series of three orifices indicated by the letters J, K and L.

The cell designations in FIG. 5 each consist of an identifying letter (referring to the orifice which prints that cell) and two subscripts. In each case the first subscript refers to an output line number count ($S_l$) and the second subscript refers to a drop count ($S_d$). The drop count, $S_d$, cycles from T-1 to 0 where T denotes the number of printing positions for each orifice. The output line count, $S_l$, increases progressively from 0 upward, with a new count being added for each new cycle of $S_d$. As shown in FIG. 5, the first cell printed by orifice J is cell $J_{00}$, and this cell is printed simultaneously with the printing of cell $K_{00}$ by orifice K and cell $L_{00}$ by orifice L (assuming that drops of ink are to be deposited at all three cell locations). Thereafter, the three orifices simultaneously print cells $J_{01}$, $K_{01}$ and $L_{01}$, and so on until they print $J_{03}$, $K_{03}$ and $L_{03}$. At this time, the line count is incremented and the orifices begin printing $J_{10}$, $K_{10}$ and $L_{10}$.

It will be seen that cell $J_{00}$ can be designated alternatively as cell $R_{38}$ $C_{25}$, where the first term denotes the row number of the scanned original document, while the second term denotes the corresponding column. The printing control electronics knows the identification of each orifice and also knows the line count and the drop count at all times. This means, in effect, that the printer knows the cell designation for each cell printed. In order to carry out the printing operation, the printer needs to know whether the scanner has generated a "0" or a "1" for that particular cell. The required information is determined by reading the stored contents for the memory row and column which correspond to the known cell identification. The determination of the correct row and column is performed by control unit 36.

The general equations for calculating the row and column numbers are:

$$R = S_1 - K_1 + S_d - (T+1)n$$

$$C = K_2 n + T + b$$

Where:

n = orifice number
b = print head number
$K_1$ = row number constant
$K_2$ = column number constant In the preferred embodiment, as herein described, there are four printing positions per orifice. For that case the above equations become:

$$R = S_d - K_1 + S_1 - 5n \qquad \text{(Equation 1)}$$

$$C = K_2 n + T \qquad \text{(Equation 2)}$$

Figure 11A:
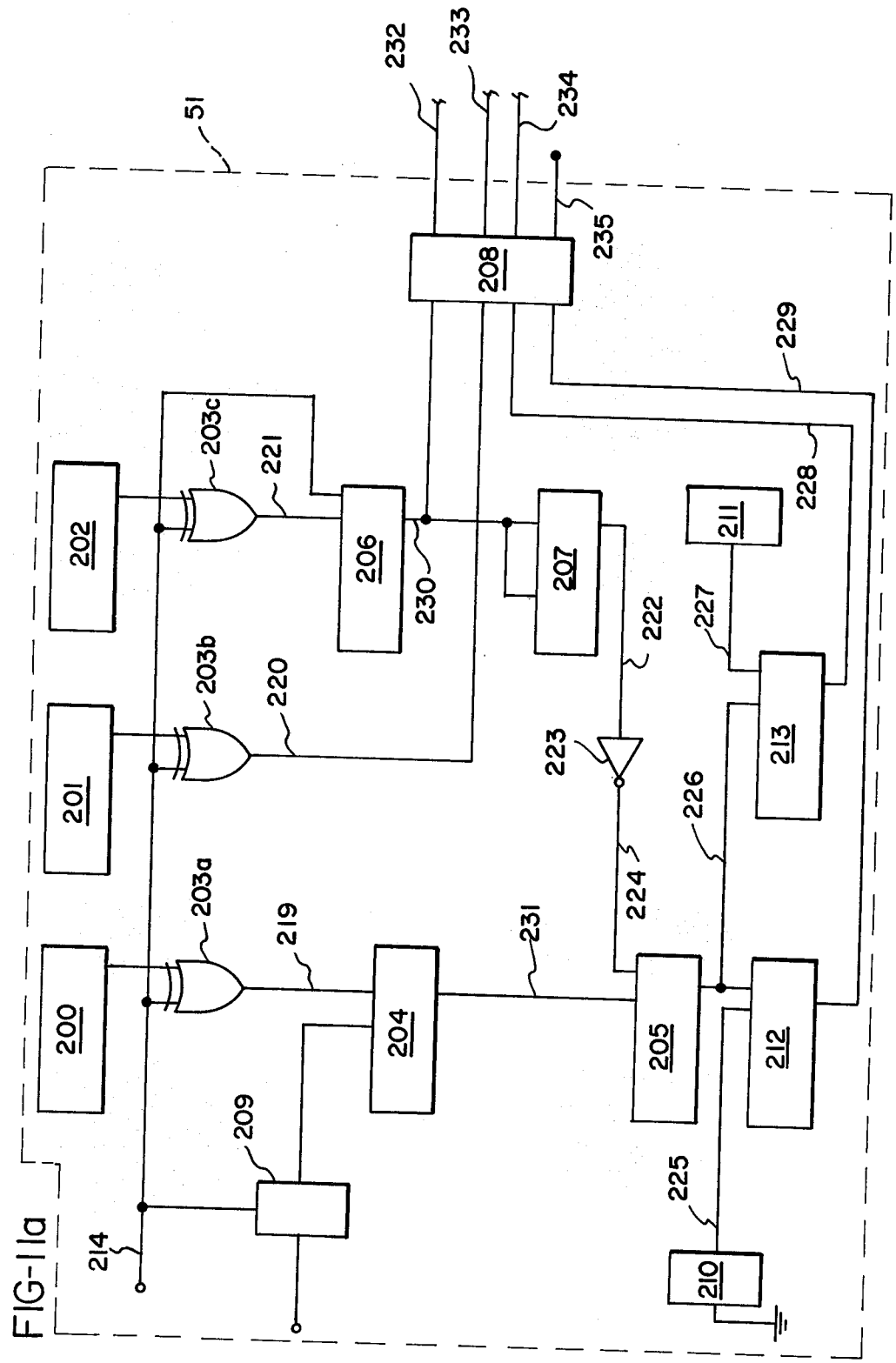

The solution of these equations is performed by circuitry as illustrated in block diagram form in FIGS. 11a and 11b. The system includes two identical circuits of the type shown in FIG. 11a and four of 11b. The circuits collectively generate row and column addresses for four groups of 54 orifices, which are all of the orifices in one print head. The memory within I/O RAM 8 is organized in such a manner that the addresses can be used in parallel for accessing data at four different memory locations. This provides printing control information for all four print heads.

Figure 12:
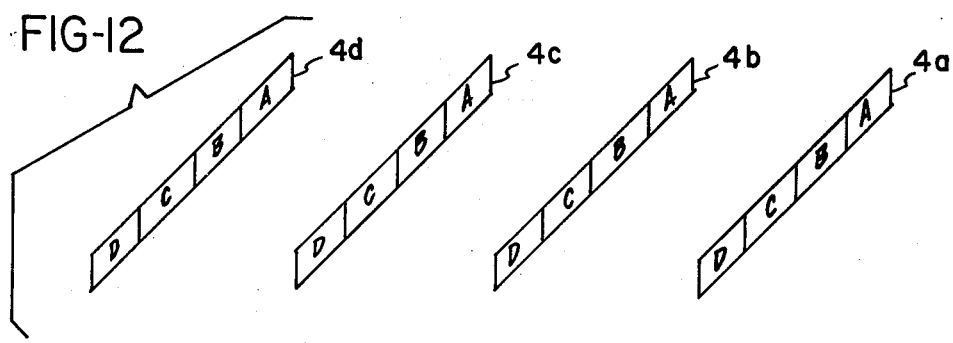
FIG. 12 illustrates an arrangement of print head segments within a series of jet drop printing heads.

Print heads 4 are therefore organized as generally illustrated by heads 4a through 4d of FIG. 12. Thus each head may be viewed as comprising four head segments A through D. Each such head segment includes orifices and printing control electronics for 54 different jets. Each jet in turn prints within four columns of FIG. 5, so that each head segment carries out the printing for a group of 216 adjacent columns representing one of the printing bands 5 of FIG. 1. Collectively, the four printing heads with the sixteen head segments print 3,456 columns across the width of copy sheet 2. Scanning array 3 therefore scans image information at 3,456 scanning positions across original document 1. The column coverage for the sixteen head segment is set forth in Table I below:

TABLE I

| Head | Segment | First Column | Last Column |
|------|---------|--------------|-------------|
| 4a   | A       | 0            | 215         |
| 4a   | B       | 216          | 431         |
| 4a   | C       | 432          | 647         |
| 4a   | D       | 648          | 863         |
| 4b   | A       | 864          | 1079        |
| 4b   | B       | 1080         | 1295        |
| 4b   | C       | 1296         | 1511        |
| 4b   | D       | 1512         | 1727        |
| 4c   | A       | 1728         | 1943        |
| 4c   | B       | 1944         | 2159        |
| 4c   | C       | 2160         | 2375        |
| 4c   | D       | 2376         | 2591        |
| 4d   | A       | 2592         | 2807        |
| 4d   | B       | 2808         | 3023        |
| 4d   | C       | 3024         | 3239        |
| 4d   | D       | 3240         | 3455        |

Figure 14:
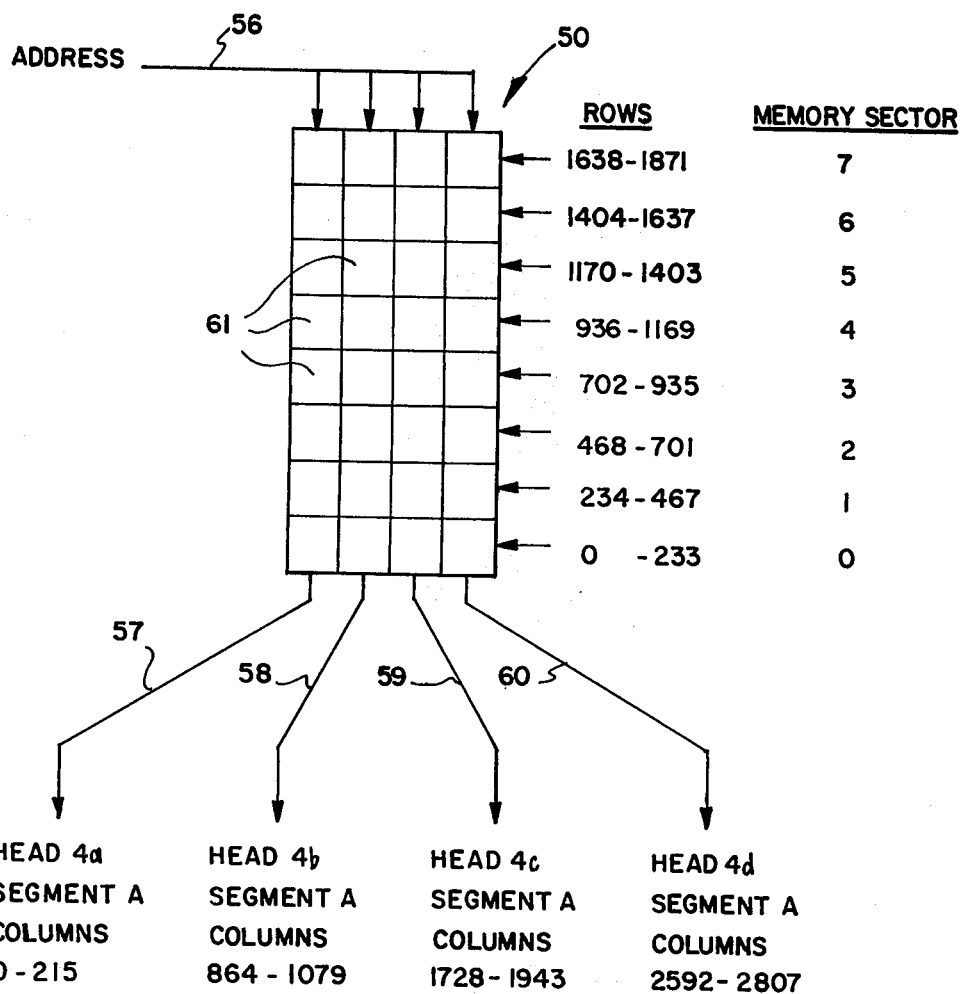
FIG. 14 is a schematic diagram of a memory segment for an Input/Output RAM.

In order to produce printing control data, I/O RAM 8 is organized into four memory segments 50, one of which is schematically illustrated in FIG. 14. Each memory segment 50 produces printing control information for one print head segment from each of print heads 4a through 4d. Thus memory segment 50 of FIG. 14 may produce printing control information for all four head segments A and stores image information for four groups of columns within eight memory sectors 0–7. In such a case the memory segment controls the printing of columns 0–215, 864–1079, 1728–1943 and 2592–2807. The actual printing of these columns is handled by the first 54 jets in each print head, all operating in synchronism and the memory organization simplifies addressing for printing control, as hereinafter described with reference to FIGS. 11a and 11b.

Each memory segment 50 comprises 32 RAM chips 61. Each such chip is a 64K storage device having 65,536 storage locations. However, not all storage locations are used. At any one time a given chip stores image information for an image area comprising 216 columns and 234 rows or 50,544 bits. Collectively, the chips comprising a memory segment 50 store image information for 1,872 rows at any one time. It will be recalled that for the embodiment herein described, each print head 4 has 216 orifices arranged at a center-to-center spacing of five scan lines in the printing direction. Thus, the print heads simultaneously print within printing cells having a maximum spacing of 1080 printing rows. This spacing is easily handled by the 1,872 scan lines of data stored in the four memory segments 50 comprising I/O RAM 8.

As printing proceeds, control unit 36 generates addresses for output reading of information stored in each of memory segments 50. This requires simultaneous generation of 4 addresses, one for each memory segment. Each such address is applied to the appropriate memory segment by a group of address lines, as indicated in FIG. 14 by the reference numeral 56. Each address is applied in parallel to four groups of RAM chips 61 for simultaneous output reading of data bits on four output lines 57–60.

The above mentioned addresses are generated by the circuitry of FIGS. 11a and 11b (together with non-illustrated companion circuitry) in accordance with equations 1 and 2 above. However, due to the organization of the memory and the addressing thereof, it is not necessary to include the term "b" in the calculation of column addresses. Thus for example, a row-column address $R_{469}$, $C_{101}$ automatically is treated as $R_{469}$, $C_{101}$ for head 4a, $R_{469}$ $C_{965}$ for head 4b, $R_{469}$, $C_{1829}$ for head 4c and $R_{469}$, $C_{2693}$ for head 4d.

During printing, control I/O RAM 8 is loaded with 1,872 scan lines of image information and thereafter is reloaded once or twice depending upon the length of the page being printed. The dynamic memory is sufficiently oversized to permit such reloading while continuously providing printing control information for the above mentioned 1080 printing rows. After a page has been printed, I/O RAM is loaded with image information for the next page.

Figure 13:
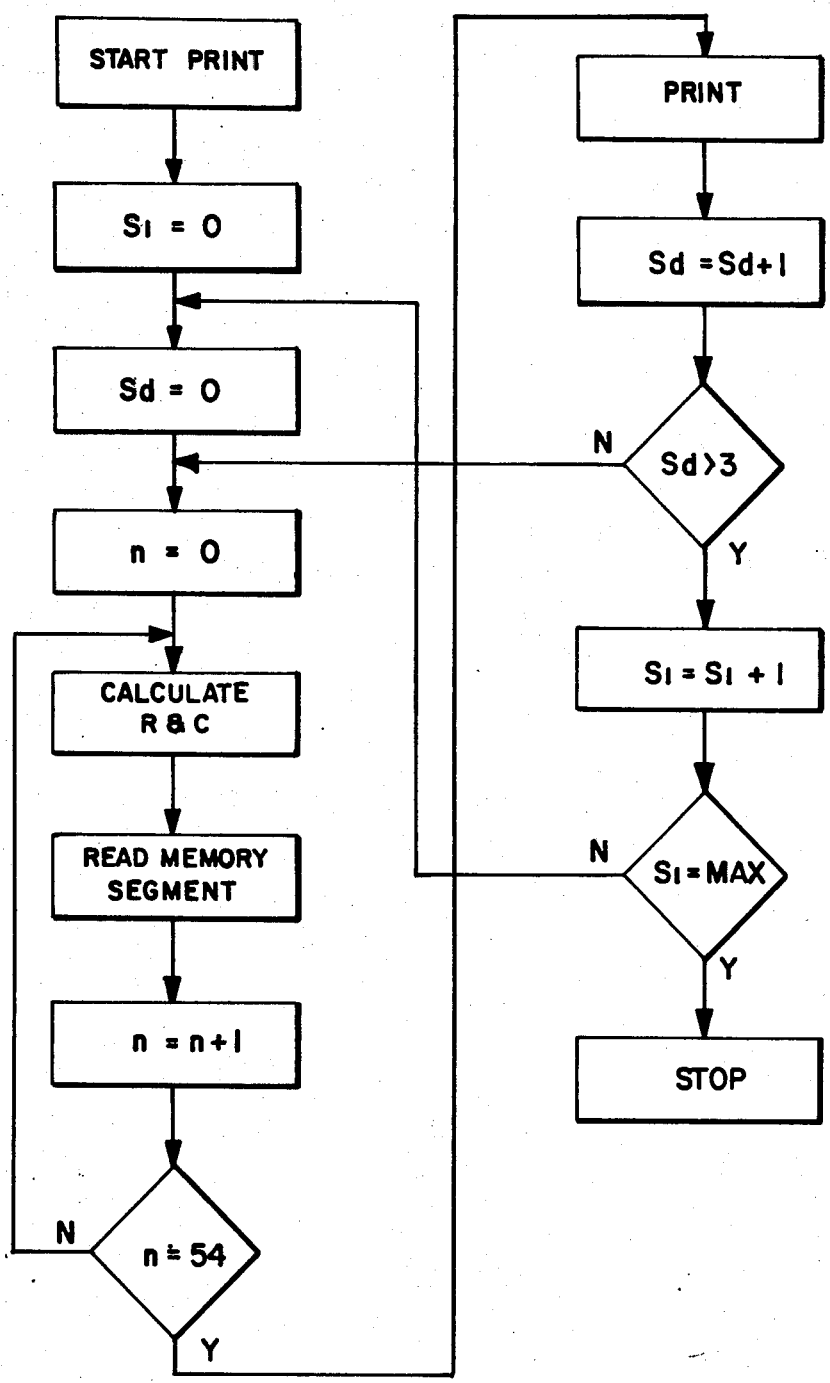
FIG. 13 is a data processing flow chart.

The flow chart of FIG. 13 illustrates the process by which the addresses applied to one of memory segments 50 are calculated. The calculation commences by setting the line number count, the drop count and the orifice count equal to 0. The system then calculates a row number and a column number for memory segment addressing. After the address has been generated, the memory segment is accessed to read out four bits of image data to be loaded into print buffer 9. Thereafter, the orifice count is incremented and a new address is calculated. Incrementing of the orifice continues until 54 addresses have been generated.

After 54 addresses have been generated, print buffer 9 contains enough data for generation of a print command for all of the jets in each of print heads 4. Accordingly, print buffer 9 transfers the accumulated image information to print electronics 10, which generate 864 printing commands (216 for each of print heads 4). At this time, all jets are in readiness for a charging control signal which will result in printing or non-printing at printing position 39a of FIG. 4.

After the first set of printing commands have been generated, the drop count ($S_d$) is incremented, and a new set of printing commands is generated. The process continues and new sets of printing commands are generated until printing control commands have been generated for printing at each of drop positions 39a through 39d. Thereafter, the line number count ($S_l$) is incremented and the logic looping continues. After the line number count reaches some maximum number indicating that the printing of information contained within the memory segment has been completed, then printing temporarily terminates, and I/O RAM 8 is loaded with new data from disk 7.

Reference will now be made to FIGS. 11a and 11b for a description of the circuitry which performs the process outlined in the flow chart of FIG. 13. FIG. 11a presents a block diagram of a row number calculation circuit 51, which produces row addresses at output lines 234 and 235 for two of memory segments 50. Accordingly, there are two such row number calculation circuits 51 for servicing the entire set of four memory segments 50.

The row number address on line 234 is applied to circuitry illustrated in FIG. 11b which calculates a column address and produces a combined address at output line 132. The row address at line 235 is applied to other circuitry similar to the circuitry illustrated in FIG. 11b. There are a total of four circuits of the type illustrated in FIG. 11b which cooperate with the illustrated row number calculation circuit 51 and its non-illustrated companion circuit.

Circuit 51 includes a 14-bit line number counter 200, a two-bit drop counter 201 and a six-bit orifice counter 202. Output counts from these three counters are applied to exclusive OR gates 203a through 203c, along with a signal on line 214 indicating whether a front side copy or a rear side copy is to be printed. As hereinafter described with reference to FIG. 7, rear side printing progresses from the bottom of the sheet upwardly, and this requires the generation of row number addresses and column number addresses which are inverted from those utilized for front side printing. Exclusive OR gates 203a through 203c perform ones complement operations on the counts passing therethrough in order to achieve the required inversions.

The row count ($S_1$) from exclusive OR gate 203a is applied via line 219 to an adder 204, where it is added to a fixed number generated by PROM 209. Prom 209 is connected to receive the rear side control signal generated on line 214 and responds by generating an appropriate row count correction number for application to adder 204.

The orifice count from exclusive OR gate 203c is similarly applied via line 221 to adder 206, which also receives an input directly from line 214. Adder 206 adjusts the orifice count as required for rear side printing.

The adjusted orifice count from adder 206 is applied via line 230 to a buffer 208 and also to another adder 207. Adder 207 effectively multiplies the orifice count by a number equal to the number of rows between orifices (in this case five). Inverter 223 inverts the output from adder 207 and applies it to adder 205, where it is added to the output from adder 204 appearing on line 231. Adder 205 then produces an output on line 226 which is equal to the quantity $S_1$.

The output from adder 205 is applied to adders 212 and 213 where it is added to numbers which are read out from PROMS 210 and 211 on lines 225 and 227, respectively. The numbers on lines 225 and 227 correspond to the term $K_1$ of Equation 1 above. The summations which are produced by adders 212 and 213 appear at output lines 229 and 228, respectively. These summations each correspond to the quantity $S_1-K_1$. The quantities on lines 229 and 228 differ only in the value of $K_1$, as generated by PROMS 210 and 211. In a typical case where the illustrated circuit 51 generates row addresses for bar segments A and B, the numbers generated by PROMS 210 and 211 are 0 and minus 270, respectively. The corresponding PROMS in the non-illustrated circuit 51 generate $K_1$ values of minus 540 and minus 810, respectively.

The quantities appearing on lines 228 and 229 are applied to buffer 208, where they are added to the drop count appearing on line 220. Buffer 208 then produces an adjusted orifice count n on line 232, an adjusted drop count $S_d$ at line 233 and two row number calculations at lines 234 and 235. The values appearing on lines 234 and 235 are solutions for Equation 1.

The circuitry appearing in FIG. 11b includes a normalizing circuit 52, a "base and where" circuit 53, a modifying circuit 54, and an addressing circuit 55. Normalizing circuit 52 normalizes the row number calculation to produce a number within the range of the eight memory sectors mentioned above. Referring again to FIG. 14, it will be seen that the eight memory sectors encompass a total of 1,872 rows. Thus a binary signal equal to the number −1,872 is applied to line 112 and supplied to adder 101 along with the signal generated by column addressing circuit 51 on line 234. Adder 101 has two outputs on line 117 and line 118 which are R-1872 (in binary form).

Circuit 52 includes another adder 102 which is connected to receive a binary number equivalent to the number minus 3,744 on line 113, as well as the row number count on line 234. Adder 102 has two outputs on line 119 and line 120 which are R-3744 (in binary form).

The output signals from adders 101 and 102 are applied to multiplexer 103, which generates a normalized row number which is less than the number 1,872. The output from multiplexer 103 appears on line 121 and is equal to the number appearing on line 234, or that number reduced by either 1,872 or 3,744 as appropriate to maintain the row number count below its maximum limit.

The normalized row number on line 121 is applied to PROM 104 and PROM 105. PROM 104 translates the row number to a base memory address number and applies the translated number on line 123 to adder 106. Adder 106 also receives an orifice count on line 232 and a drop count on line 233. Adder 106 carries out the addition of Equation 2 above to compute a column number. The column number then is combined with the address received on line 123 to produce a 16-bit memory address on line 124. This address is applied to buffer 107. Buffer 107 also receives a memory sector number on line 122 from PROM 105 and a print interruption command on line 116 from comparator 110. Comparator 110 compares the row number count on line 234 with a maximum count received on line 115 from PROM 111. If the count on line 234 exceeds the count on line 115, then the system determines that the length of copy sheet 2 has been exceeded and that printing must be halted, for that particular Rand n.

Buffer 107 generates a memory sector address on line 129, a print interruption command on line 130 and a 16-bit memory address on line 126. The memory address on line 126 is applied to multiplexer 108 along with a signal on line 125 which is the dynamic RAM memory address switch. Multiplexer 108 generates two eight-bit memory address for addressing one of the four memory segments 50. These two addresses are the row and column addresses for the dynamic RAMS. In conjunction with the memory address of line 132, a memory sector address is generated on line 129. The memory sector address designates in which memory sector of FIG. 14 the required data is located. This data is generated by PROM 105 from data on line 121.

Referring again to FIG. 5, it will be seen that the printing control data is arranged in such a manner as to provide printing commands for a row of orifices which simultaneously print within cells having a separation of four columns and five rows. If the columns and rows are equally spaced, then the inclination angle of each of the printing heads is 53.13 degrees. However, there are certain grid matching constraints which restrict the head inclination angle and generally require that the column and row spacing not be quite equal.

Figure 6:
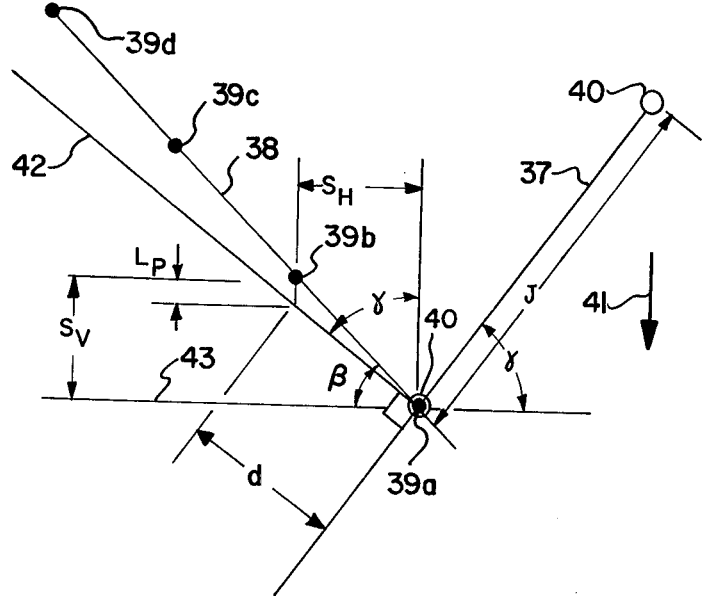
FIG. 6 is a diagrammatic illustration of the relationship between an image bar axis, a drop impact line and a drop trajectory line.
Figure 6A:
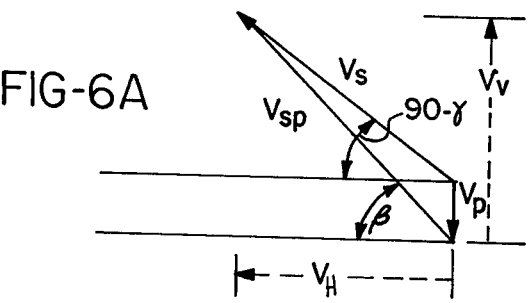
FIG. 6A is a diagram of velocity vectors associated with the geometry at FIG. 6.

The grid matching problem can be understood by referring to FIGS. 6 and 6A. FIG. 6 illustrates a line 37 which is parallel to a row of orifices in one of the print heads 4. That line makes an angle α with a reference line 43 parallel to the rows of FIG. 5. The jet stream which is emitted from an orifice 40 is swept along a scan line 42 which is perpendicular to line 37. However, as the jet sweeps, the drops are actually deposited at a series of printing positions 39a through 39d (centers of drop impact) on the printing surface. These printing positions have a horizontal separation $S_H$ and a vertical separation $S_V$, and the line of printing positions is the line 38. As the jet is printing sequentially at the positions 39a through 39d, the paper is moving in the direction of the arrow 41. During the time required between prints, the paper moves a distance $L_p$. Thus, scan line 42 does not coincide with print line 38. As shown, line 38 makes an angle $\beta$ with the horizontal reference line.

The vector diagram of FIG. 6A illustrates the relative movement involved during the above discussed jet scanning. For purposes of the illustration, $V_p$ represents the paper movement velocity, $V_s$ represents the jet actual sweep velocity and $V_{sp}$ represents the jet sweep velocity relative to the paper (as seen in a coordinate system which moves with the paper). $V_{sp}$ has a horizontal component $V_H$ and a vertical component $V_V$. The velocity components $V_H$ and $V_V$ are related to the distance $S_H$ and $S_V$ of FIG. 6 by the equations:

$$S_H = \frac{V_H}{f_p} = \frac{V_s \sin \gamma}{f_p} \quad \text{(Equation 3)}$$

$$S_V = \frac{V_V}{f_p} = \frac{V_p + V_s \cos \gamma}{f_p} \quad \text{(Equation 4)}$$

where $f_p$ is the printing frequency (actual drop generation frequency will be higher due to the use of guard drops).

FIG. 6 also illustrates a distance d which is the actual position-to-position drop deflection distance as measured in a non-moving frame of reference. This deflection results from drop charging and deflection and system geometry as illustrated in FIG. 4. Generally speaking, the deflection distance d will be something less than a printed dot diameter so as to provide overlap of printed dots.

The printing frequency $f_p$ of equations (3) and (4) is generally limited by drop stimulation limitations and system data rate limitations. The sweep speed is related to the printing frequency by the equation $$\frac{V_s}{f_p} = d \quad \text{(Equation 5)}$$

If this expression is substituted into equation (3) the print head angle is found to be established by the relation $$\gamma = \sin^{-1}\left(\frac{S_H}{d}\right) \quad \text{(Equation 6)}$$

After the print head angle has been established, the distance J between orifices can be established from the relationship $$J = \frac{M S_H}{\cos \gamma} \quad \text{(Equation 7)}$$

where M denotes the number of print levels per sweep (in this case 4).

The grid matching problem arises by reason of the fact that the rows printed by drops from one orifice must be in registration with rows printed by drops from all other orifices. This means that the grid matching consideration requires that $$J = \frac{G S_V}{\sin \gamma} \quad \text{(Equation 8)}$$

where
G is any positive integer
Thus $$\frac{G S_V}{\sin \gamma} = \frac{M S_H}{\cos \gamma} \quad \text{(Equation 9)}$$

and $$S_V = \frac{M S_H}{G} \tan \gamma \quad \text{(Equation 10)}$$

which constrains the vertical distance between printing rows to one of a discrete number of values in accordance with the selected value of G.

Now by substituting the expression of equation (10) into equation (4) and making other substitutions, $V_p$ is found to be given by the equation:

$$V_p = f_p \left(\frac{J}{G} \sin \gamma - d \cos \gamma\right) \quad \text{(Equation 11)}$$

Thus, the paper movement speed must be set in accordance with equation (11) to produce the row distance $S_V$ as set forth by equation (10). In a typical case the following values may be used:
$S_H = 0.002459$ in.
$f_p = 46.424$ KHz
d = 0.0031106 in.
$\gamma = 52.2388$ deg.
J = 0.016063 in.
G = 5
$S_V = 0.0025398$ in.
$V_p = 29.48$ in./sec.

It will be seen that the scanner must be operated so as to produce the same values of $S_H$ and $S_V$ as are printed by the print heads. Within the scanner, $S_H$ is adjusted by adjusting the spacing of the photosensors in scanning array 3. $S_V$ is adjusted by adjusting the speed of movement of original document 1 and the frequency at which buffer 6 samples the output from scanning array 3.

It will be appreciated that the direction of the sweep $V_s$ may be reversed so that the print head prints marks at printing positions 39a-39d in the reverse sequence. Such an arrangement causes changes in the print head angle $\gamma$ and other design parameters, but there is no change in the manner of operation.

Figure 7:
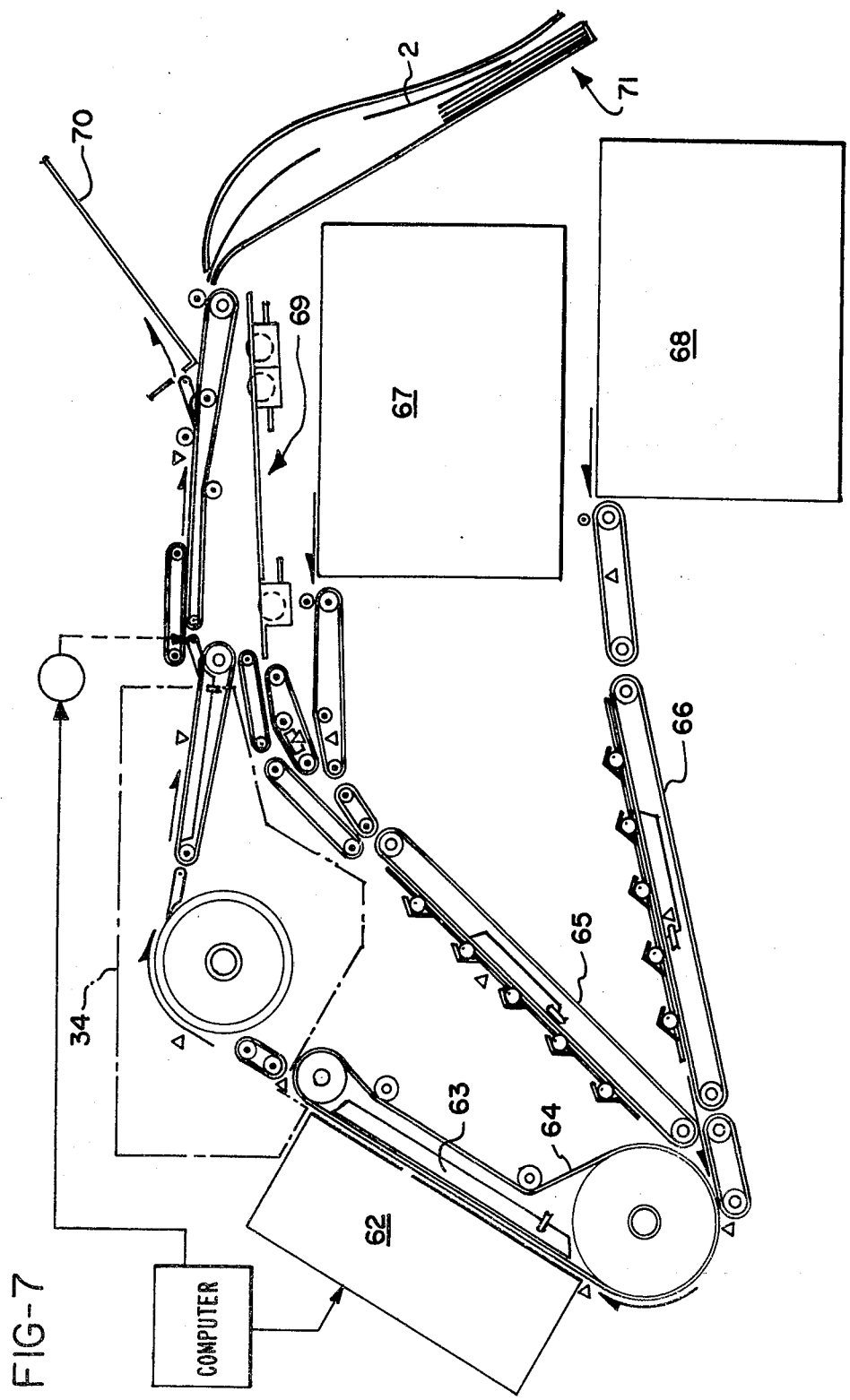
FIG. 7 is a schematic side elevation view of apparatus for handling copy sheets and feeding them to an ink drop printer.

A set of four print heads, angled and spaced as above described, may be incorporated into a print module 62 and upwardly inclined as illustrated in FIG. 7. Copy sheets 2 for printing by the print module 62 may be supplied by one or both of paper supplies 67 or 68. Paper supplied by paper supply 67 and 68 travels along one or the other of alignment stations 65 or 66, respectively to a common point on a vacuum belt 64. Vacuum belt 64 carries the copy sheets upwardly under print module 62 where they are printed.

Printed sheets from print module 62 pass through a dryer 34, which may be positioned as illustrated by phantom lines on FIG. 7. The sheets are then directed either to an accumulator 71 or an inverter 69. Sheets which are directed toward inverter 69 are fed to alignment stations 65 for reverse side printing. Provision is also made for directing printed sheets to a sample tray 70.

It will be appreciated that a number of copy sheets may be in the printing path at any one time and that the printed sheets may be mixed. That is, one sheet in the path may be traveling toward print module 62 for reverse side printing while the next sheet may be programmed for front side printing. Also, the images printed on successive sheets may be images of different pages of an original document, and the copy sheets may be sheets destined for different sets of original document copies.

Figure 9:
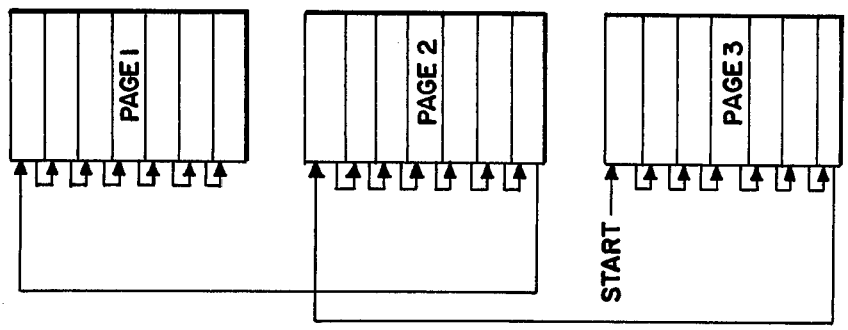
FIG. 9 illustrates the printing sequence for a plurality of copy sheets which are printed on a single side only.
Figure 8:
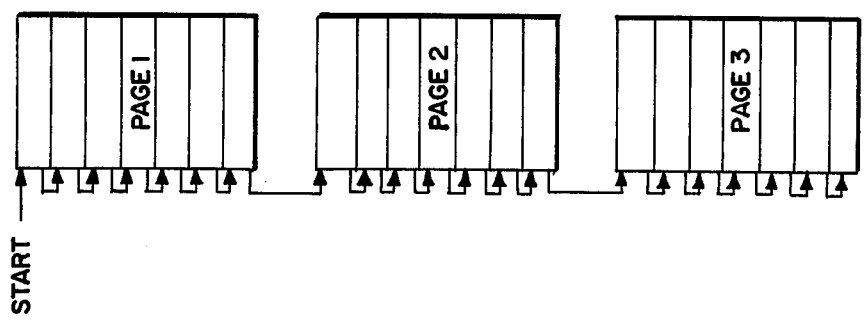
FIG. 8 illustrates the scanning pattern for a plurality of original documents.

FIG. 8 illustrates the scanning sequence for a plurality of original documents. As illustrated in FIG. 8, three original documents may be scanned in sequence from top to bottom and the information so scanned is loaded into memory. When the duplicator makes a copy of such a document on the front sides only of three copy sheets, then printing commences that the top of page 3, as illustrated in FIG. 9. Printing progresses along page 3 from top to bottom and then along page 2 from top to bottom. Lastly, page 1 is printed from top to bottom.

Figure 10:
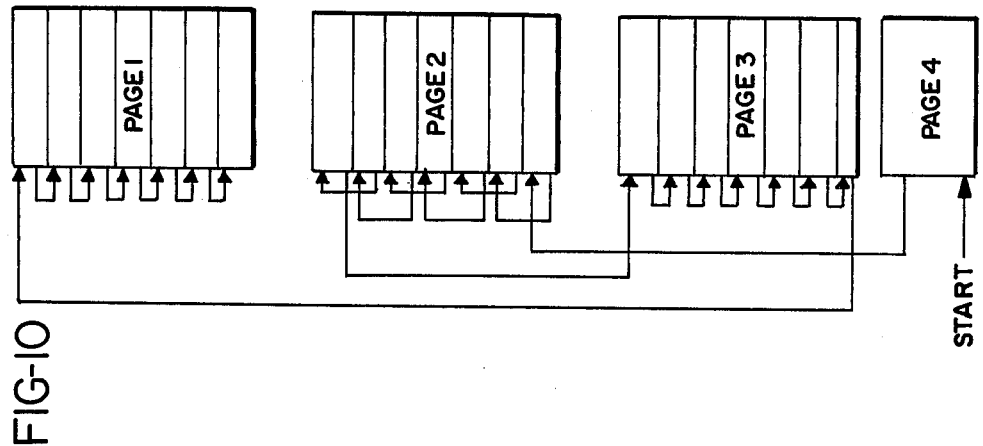
FIG. 10 illustrates the printing sequence for a plurality of copy sheets which are printed on both sides.

For duplex printing of a document which may comprise four pages, printing proceeds as illustrated in FIG. 10. Thus, page 4 is printed from bottom to top, followed by bottom to top printing of page 2. Thereafter, pages 3 and 1 are printed in sequence from top to bottom. A programmed microprocessor may be used for controlling the printing sequence as well as the document handling and other operations related thereto. Preferably, the system uses a multiprocessor including a programmed system controller and separately programmed area controllers. A number of suitable microprocessing systems are commercially available for such purposes.

A number of alternative embodiments of the present invention will be readily apparent. For example, control unit 36 could address I/O RAM 8 prior to input to disk unit 7, so that scanning data from scan buffer 6 would be stored by disk unit 7 in a transformed format. In such an embodiment the data read out from disk unit 7 could be supplied directly to print buffer 9.

In another alternative embodiment, printing heads 4 could use magnetic deflection techniques rather than electrostatic deflection as described. Suitable structure for such a print head is disclosed in Jensen et al. U.S. Pat. No. 4,025,925.

While the form of apparatus herein described constitutes a preferred embodiment of the invention, it is to be understood that the invention is not limited to this precise form of apparatus, and that changes may be made therein without departing from the scope of the invention.

What is claimed is:

1. An ink drop duplicating system comprising:
a support member;
means for transporting a printing substrate across said support member;
a plurality of parallel and angularly extending jet drop printing heads supported adjacent said support member and collectively defining a printing region for progressive printing of a printing substrate transported therethrough, each of said printing heads comprising means for generating an angularly extending row of drop streams, deflecting means for deflecting selected ones of the drops comprising said streams in a direction perpendicular to the direction of extent of said row so as to deposit upon said printing substrate at predetermined angularly extending printing positions, drop control means responsive to a series of drop commands for selecting those of said drops which are to be so deposited, and catching means extending parallel to the direction of extent of said row for catching those of said drops which are not so selected;
sensing means for viewing a series of picture elements at side-by-side sensing positions within a strip extending across an original document and generating a series of print/no-print data bits corresponding to the picture elements so viewed;
scanning means for causing said strip to be scanned along said document so that said sensing means views all portions thereof which are to be duplicated, and
data control means for establishing a locational correspondence between said sensing positions and said printing positions, selecting said data bits in accordance with said locational correspondence and generating said drop commands in accordance with the print/no-print states of the data bits so selected.

2. Apparatus according to claim 1 wherein said drop cotrol means comprises charging means for selectively charging drops in said streams to one of a plurality of different charging levels and said deflecting means comprises means for generating a static electrical field extending across the paths of said streams in the direction of desired drop deflection, so that the drops passing therethrough are deflected in said direction toward said printing positions.

3. Apparatus according to claim 2 wherein said catching means are positioned for catching those of said drops which are uncharged.

4. Apparatus according to any of claims 1, 2 or 3 wherein four of said printing heads are provided.

5. Apparatus according to claim 4 wherein each of said printing heads is inclined at an angle of 52.2388 degrees with respect to a line which is perpendicular to the direction of movement of said printing substrate relative to said support member.

6. Apparatus according to claim 2 wherein said strip extends across one major dimension of said document and further wherein said scanning means causes scanning motion of said strip along the other major dimension of said document.

7. Apparatus according to claim 6 and further comprising non-volatile storage means for storage of data originated by said sensing means and a random access memory connected to operate as an input/output port for said non-volatile storage means.

8. Apparatus according to claim 7 wherein said random access memory supplies said print/no-print data bits to said non-volatile storage means in sequence corresponding to the scanning sequence by said sensing means.

9. Apparatus according to claim 8 wherein said data control means comprises means for addressing said random access memory to read out said data bits in a sequence corresponding to the printing sequence of said printing heads so that said data bits are transformed into said drop commands.

10. Apparatus according to claim 9 wherein said non-volatile storage means comprises a magnetic disk.

11. Apparatus according to claim 7 wherein said photosensing means comprise a row of photosensing elements for viewing columns on said original document which are evenly spaced across one dimension of said document.

12. Apparatus according to claim 11 wherein said printing heads are angled with respect to said copy sheet by an angle $\gamma$ such that $$\gamma = \sin^{-1}\left(\frac{S_H}{d}\right)$$

and wherein $S_H$ is the width of said columns and d is the deflection distance between adjacent ones of the printing trajectories of one of said streams, as measured at the plane of said copy sheet and perpendicular to the axes of said printing heads.

13. Apparatus according to claim 12 wherein said streams are generated by rows of orifices in each of said heads which are spaced at a center-to-center spacing J such that $$J = \frac{M S_H}{\cos \gamma}$$

where M represents the number of printing trajectories for each stream.

14. Apparatus according to claim 13 wherein said transport means moves said copy sheet at a speed $V_p$ such that $$V_p = f_p\left(\frac{J}{G} \sin \gamma = d \cos \gamma \right)$$

where G is an integer number and $f_p$ is the frequency of generation of said multi-level control signals.

15. Apparatus according to any of claims 11 through 14 wherein each of said streams has four printing trajectories.

16. Apparatus according to claim 7 wherein said data control means comprises means for causing the data stored within said non-volatile storage means to be read out repetitively for producing multiple copies of said original document.

* * * * *

UNITED STATES PATENT AND TRADEMARK OFFICE
CERTIFICATE OF CORRECTION

PATENT NO. : 4,467,366
DATED : August 21, 1984
INVENTOR(S) : Thomas W. Bobick

It is certified that error appears in the above-identified patent and that said Letters Patent is hereby corrected as shown below:

Column 1, line 16, "Nos." should be --No.--;

line 50, "in shown" should be --is shown--.

Column 14, line 22, "cotrol" should be --control--.

Column 16, the equation between lines 10 and 15:

the equal sign, second occurrence, should be a minus sign.

Signed and Sealed this

Eleventh Day of June 1985

[SEAL]

Attest:

DONALD J. QUIGG

Attesting Officer     Acting Commissioner of Patents and Trademarks